United States Patent
Putzolu

(10) Patent No.: US 9,871,763 B2
(45) Date of Patent: *Jan. 16, 2018

(54) METHOD AND SYSTEM FOR DYNAMIC APPLICATION LAYER GATEWAYS

(71) Applicant: Intel Corporation, Santa Clara, CA (US)

(72) Inventor: David Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,499

(22) Filed: Apr. 8, 2015

(65) Prior Publication Data

US 2015/0358280 A1    Dec. 10, 2015

Related U.S. Application Data

(63) Continuation of application No. 13/632,806, filed on Oct. 1, 2012, now Pat. No. 9,021,012, which is a continuation of application No. 12/622,250, filed on Nov. 19, 2009, now Pat. No. 8,280,945, which is a continuation of application No. 10/739,783, filed on Dec. 19, 2003, now Pat. No. 7,743,089, which is a continuation of application No. 09/545,564, filed on May 4, 2000, now abandoned, which is a continuation of application No. 09/417,527, filed on Oct. 13, 1999, now abandoned.

(51) Int. Cl.
*H04L 29/00* (2006.01)
*H04L 29/06* (2006.01)
*G06F 9/48* (2006.01)
*H04L 12/24* (2006.01)
*H04L 29/08* (2006.01)

(52) U.S. Cl.
CPC ............ *H04L 63/02* (2013.01); *G06F 9/4868* (2013.01); *H04L 41/048* (2013.01); *H04L 63/0227* (2013.01); *H04L 63/101* (2013.01); *H04L 67/34* (2013.01); *H04L 67/2823* (2013.01); *H04L 67/2842* (2013.01)

(58) Field of Classification Search
CPC .............................. H04L 63/02; H04L 63/101
See application file for complete search history.

(56) References Cited

U.S. PATENT DOCUMENTS

| | | | |
|---|---|---|---|
| 5,825,759 A | 10/1998 | Liu | |
| 5,832,221 A | 11/1998 | Jones | |
| 5,852,717 A * | 12/1998 | Bhide | H04L 29/06 709/203 |
| 5,903,732 A | 5/1999 | Reed | |

(Continued)

OTHER PUBLICATIONS

Tripathi et al., "Mobile agent programming in Ajanta," 19th International Conference on Distributed Computing Systems, May 31 to Jun. 4, 1999, Austin, Texas.

(Continued)

*Primary Examiner* — Brandon Hoffman
*Assistant Examiner* — Helai Salehi
(74) *Attorney, Agent, or Firm* — Christopher K. Gagne

(57) ABSTRACT

A method and system are disclosed for providing functionality on a network. A mobile agent moves from a first node to a target node and, at the target node, performs as an application layer gateway.

27 Claims, 9 Drawing Sheets

(56) References Cited

U.S. PATENT DOCUMENTS

| | | | |
|---|---|---|---|
| 6,119,165 A * | 9/2000 | Li | H04L 29/06 709/218 |
| 6,233,601 B1 * | 5/2001 | Walsh | G06F 9/465 709/202 |
| 6,282,563 B1 * | 8/2001 | Yamamoto | H04L 67/2842 709/202 |
| 6,282,582 B1 | 8/2001 | Oshima | |
| 6,330,588 B1 | 12/2001 | Freeman | |
| 6,334,146 B1 | 12/2001 | Parasnis | |
| 6,408,391 B1 | 6/2002 | Huff | |
| 6,456,306 B1 | 9/2002 | Chin | |
| 6,460,070 B1 * | 10/2002 | Turek | G06F 11/0709 709/202 |
| 6,466,963 B1 | 10/2002 | Shigemori | |
| 6,473,761 B1 | 10/2002 | Shigemori | |
| 6,484,211 B2 | 11/2002 | Turunen | |
| 6,496,871 B1 | 12/2002 | Jagannathan | |
| 6,622,157 B1 | 9/2003 | Heddaya | |
| 6,959,318 B1 * | 10/2005 | Tso | G06F 17/30902 707/E17.12 |
| 7,096,253 B2 * | 8/2006 | Vinson | G06F 9/445 709/203 |

OTHER PUBLICATIONS

Karnik et al., "Design issue in mobile agent programming systems," IEEE Concurrency, Jul.-Sep. 1998, pp. 1 to 16.
Karnik et al., "Agent server architecture for the Ajanta mobile-agent system," 1998 International Conference on Parallel and Distributed Processing Techniques and Applications (PDPTA '98), Las Vegas, Jul. 1998.
Tripathi et al., "Protected resource access for mobile agent-based distributed computing," ICPP workshop on wireless networking and mobile computing, Minneapolis, Aug. 1998.
Zhang et al., "Developing network management applications in an application-oriented way using mobile agent," Computer Network and ISDN Systems 30 (1998), pp. 1551-1557.
Susilo et al., Infrastructure for advanced network management based on mobile code, Systems and Computer Engineering, IEEE, 1998, pp. 322-333.
Appeal decision from BPAI for U.S. Appl. No. 09/417,527, dated Jul. 30, 2007.
Office Action in U.S. Appl. No. 09/417,527, dated Apr. 12, 2006 (and related attachments).
Office Action in U.S. Appl. No. 09/417,527, dated Jul. 13, 2005 (and related attachments).
Office Action in U.S. Appl. No. 09/417,527, dated May 12, 2004 (and related attachments).
Office Action in U.S. Appl. No. 09/417,527, dated Feb. 3, 2004 (and related attachments).
Office Action in U.S. Appl. No. 09/417,527, dated Aug. 14, 2003 (and related attachments).
Office Action in U.S. Appl. No. 09/417,527, dated Mar. 27, 2003 (and related attachments).
Office Action in U.S. Appl. No. 09/417,527, dated Oct. 23, 2002 (and related attachments).
Office Action in U.S. Appl. No. 10/739,783, dated Sep. 29, 2009 (and related attachments).
Office Action in U.S. Appl. No. 10/739,783, dated Aug. 13, 2009 (and related attachments).
Notice of Allowance in U.S. Appl. No. 10/739,783, dated Oct. 7, 2009 (and related attachments).
Office Action in U.S. Appl. No. 10/739,783, dated Feb. 27, 2009 (and related attachments).
Office Action in U.S. Appl. No. 10/739,783, dated Aug. 18, 2008 (and related attachments).
Office Action in U.S. Appl. No. 10/739,783, dated Jun. 3, 2008 (and related attachments).
Office Action in U.S. Appl. No. 10/739,783, dated Jan. 25, 2008 (and related attachments).
Office Action in U.S. Appl. No. 10/739,783, dated Jul. 6, 2007 (and related attachments).
Notice of Allowance in U.S. Appl. No. 12/622,250, dated Sep. 5, 2012 (and related attachments).
Office Action in U.S. Appl. No. 12/622,250, dated Feb. 22, 2012 (and related attachments).
Office Action in U.S. Appl. No. 12/622,250, dated Oct. 13, 2011 (and related attachments).
Office Action in U.S. Appl. No. 12/622,250, dated Apr. 19, 2011 (and related attachments).
Office Action in U.S. Appl. No. 12/622,250, dated Feb. 7, 2011 (and related attachments).
Office Action in U.S. Appl. No. 12/622,250, dated Sep. 17, 2010 (and related attachments).
Notice of Allowance in U.S. Appl. No. 13/632,806, dated Mar. 16, 2015 (and related attachments).
Office Action in U.S. Appl. No. 13/632,806, dated Apr. 23, 2014 (and related attachments).
Office Action in U.S. Appl. No. 13/632,806, dated Mar. 20, 2014 (and related attachments).
Office Action in U.S. Appl. No. 13/632,806, dated Jan. 6, 2014 (and related attachments).
Office Action in U.S. Appl. No. 13/632,806, dated Jun. 14, 2013 (and related attachments).

* cited by examiner

METHOD AND SYSTEM FOR DYNAMIC APPLICATION LAYER GATEWAYS

RELATED APPLICATIONS

This application is a continuation of U.S. application Ser. No. 10/739,783 filed Dec. 19, 2003, which is a continuation of U.S. application Ser. No. 09/565,564 filed May 4, 2000, which is a continuation of U.S. application Ser. No. 09/417,527 filed Oct. 13, 1999.

BACKGROUND OF THE INVENTION

I. Field of the Invention

This invention relates to computer systems, in particular to network environments.

II. Background Information

Organizations use networks consisting of nodes connected by links to share device capabilities and information and to allow users to communicate and exchange information. A node may perform various functions; for example a node may run user applications and also act as a network management console. A node may be termed a host or a device, and may be a PC, workstation or laptop running a user application program, a router, an application layer gateway ("ALG"), a server, or any other device attached at some time to a network.

As network use and the complexity of networks increase, organizations wish to enhance the ability of processes to share data and functionality and to broaden the services delivered by computer networks. One method of enhancing network services is to use ALGs. ALGs are devices or modules placed in a network which manipulate, modify, filter, source, or sink data passing between nodes to provide a service, to enforce a policy or to perform other functions. An ALG may refer to the device functioning as an ALG or to a software module resident on a device which provides ALG functionality; the functionality of an ALG may be distributed over multiple devices or software modules.

For example, a web cache ALG may provide a service by storing Internet web pages which are used frequently on a local network but which are remotely available; the web cache obviates the need for continually requesting web pages from the remote web server. A firewall ALG may exist at the edge of a network and enforce a security policy by barring entry to certain kinds of network traffic—the firewall filters incoming packets so that only certain packets are allowed in to the network. A proxy firewall acts as an intermediary between a node on a network and a remote server, filtering the data passed between the two devices so network security and administrative control may be enforced. A media transcoder may accept a stream of traffic from a remote site representing, for example, audio or video information, and modify the stream of data by converting that information into a certain format before forwarding the information to a local client. A web translator may accept web pages in a certain language and modify the web pages to convert them to another language.

The potential and widespread use of ALGs has been limited because, currently, installing and configuring an ALG involves a certain amount of time and resources on the part of a system administrator. An administrator must physically visit a device which is to function as the ALG and install the ALG on that device. In addition, an administrator may have to physically install a device or piece of hardware which acts as an ALG. For example, to add a firewall to a network, an administrator may have to physically add a network node or a piece of hardware which acts as the firewall. Currently, altering the functionality of an installed ALG, moving an ALG from one device or location to another, or uninstalling an ALG requires time and effort. ALGs are not used as often as they could be due to these barriers. While an ALG is installed on a device it takes up the resources of the device which functions as the ALG. If the functionality of the ALG is needed for only a short amount of time installing and then un-installing the ALG may not be worthwhile. If the functionality of an ALG is required periodically it may not be worthwhile to permanently devote the resources of a device to the ALG. In such a case reducing the costs (in work hours and equipment) of installing and uninstalling ALGs would dramatically increase their use. Allowing ALGs to be easily installed, modified and uninstalled on various devices on a network would increase the use of ALGs.

Therefore, there exists a need for a system and method that enables easy installation, uninstallation, movement and modification of modules or components functioning as ALGs, without the need to physically visit a node and without the need to install additional hardware. There exists a need for a system and method enabling such modules or components to be easily created and configured, and which may be easily and quickly installed, without the need for physically visiting the device at which it functions.

SUMMARY OF THE INVENTION

A method and system are disclosed for providing functionality on a network. A mobile agent moves from a first node to a target node and, at the target node, performs as an application layer gateway.

DETAILED DESCRIPTION

I. Overview

Figure 1:
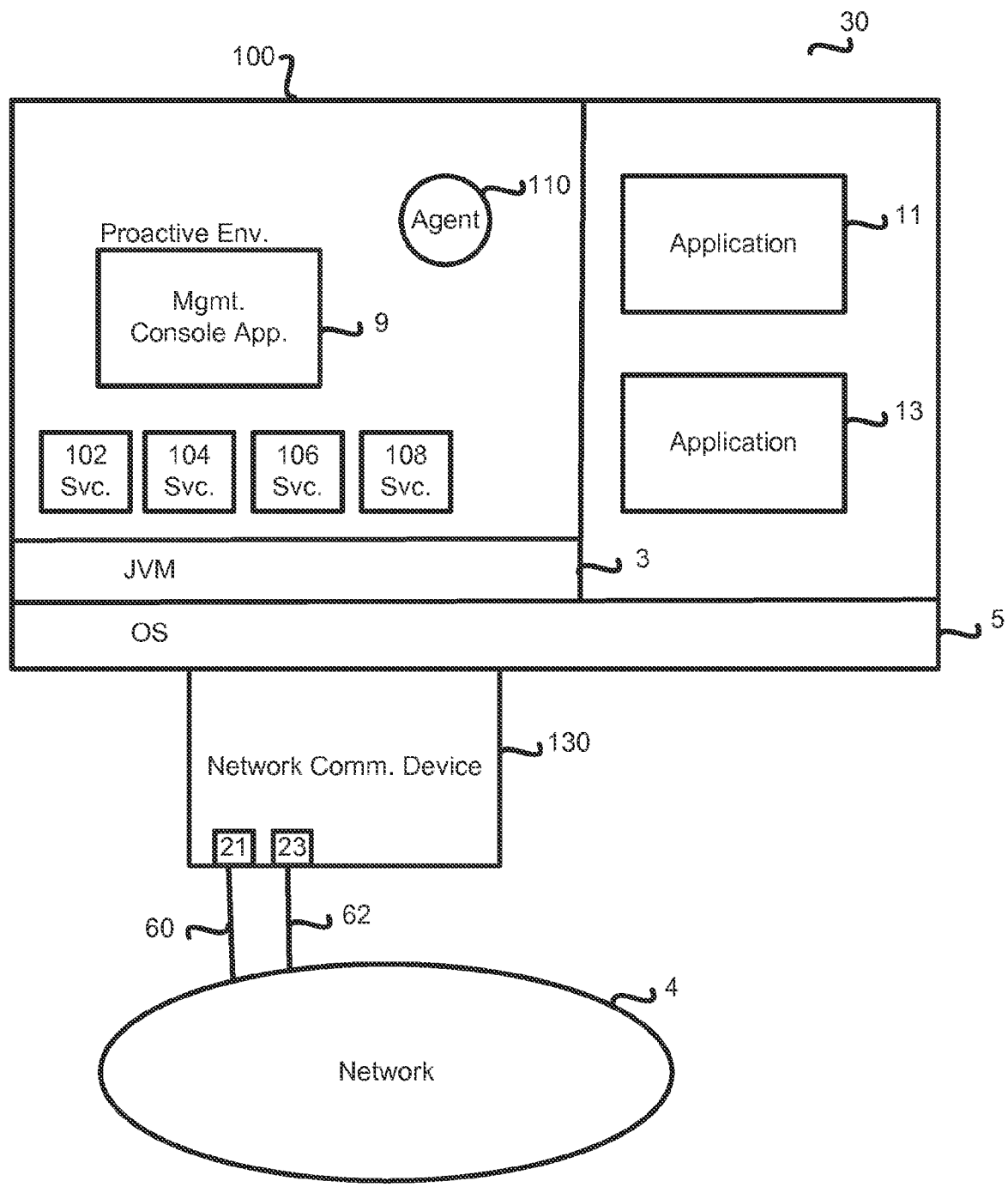
FIG. 1 is a block diagram illustrating a network node according to an embodiment of the present invention.

In the following description, various aspects of the present invention will be described. For purposes of explanation, specific configurations and details are set forth in order to provide a thorough understanding of the present invention.

However, it will also be apparent to one skilled in the art that the present invention may be practiced without the specific details. Furthermore, well known features are omitted or simplified in order not to obscure the present invention.

The system and method of an exemplary embodiment of the present invention use agents—mobile software modules—to function as ALGs. The agent ALGs can be quickly and easily created, deployed, moved, altered, or destroyed, and all such actions can be initiated and controlled by an operator at a central console. The operator does not have to physically visit a node to perform any of these functions. In an alternate embodiment an agent ALG may use another software module to provide the bulk of ALG functionality—such a software module may function in cooperation with or independently of the agent ALG. In such a case an agent ALG may install and configure a software module to provide some portion of ALG functionality.

When used herein, an agent is a software module having the capability to move from node to node on a network and to execute on the nodes to which it moves. In an exemplary embodiment of the present invention an agent may be, for example, a module functioning as an ALG, but may also provide other functionality, such as altering a routing table or serving as a user application.

In exemplary embodiment, when ALG functionality is required at a node (termed the "ALG node"), an agent ALG is launched from one node and moves across the network to the ALG node. Agent ALGs of the system and method of the present invention may provide the function of current ALGs (i.e., a media transcoder or a web cache), using known methods or methods not yet developed. The agent ALGs of the system and method of the present invention may function an order of magnitude slower than dedicated network equipment such as routers or switches. Therefore an exemplary embodiment of the system and method of the present invention provide that an agent ALG, as part of its installation, alters the traffic routing configuration of route devices nearby (in the network topology) to the ALG node so that only relevant traffic is sent to the agent ALG. To access relevant traffic an agent ALG may reconfigure certain modules at the ALG node so that the traffic diverted to the ALG node is received by the agent ALG. In alternate embodiments of the present invention, agent ALGs are not required to divert or capture relevant traffic or to alter network routing or modules of the ALG node.

The system and method of the present invention, using agents capable of being directed to deploy and act as ALGs, reduce the amount of human and other resources required to deploy and maintain ALGs, and therefore can be used to increase the use of ALGs. The system and method of the present invention reduce the need for an administrator to physically visit a device which is to function as an ALG to install the ALG, alter the functionality of the ALG, move the ALG, or uninstall the ALG. Since an agent may be launched which acts as an ALG and which automatically moves to and installs itself on a network device, an administrator is not required to physically install a device or piece of hardware which acts as an ALG. That ALGs can be quickly and easily moved or uninstalled allows for the resources of devices supporting ALGs to be more efficiently and flexibly used.

An agent which acts as an ALG or performs other functionality may require a certain mobile agent environment or platform to execute and may not be able to execute on every node on a network. An exemplary embodiment of the system and method of the present invention uses a particular mobile agent environment, termed a proactive environment, to create and support mobile agents. Alternate embodiments may use other systems to provide agents with such capabilities. For example, other mobile agent environments may be used, or types of agents may be used which may operate without the aid of such an environment.

II. Proactive Environment

An exemplary embodiment of the system and method of the present invention requires agents to be able to migrate among nodes, executing and performing tasks at each node, and to have access to resources at each node. An exemplary embodiment uses a particular mobile agent environment, termed a proactive environment, to create and support agents with these capabilities. Alternate embodiments may not require the particular mobile agent environment described herein, or may not require a mobile agent environment separate from an operating system.

An embodiment of the proactive environment used with the present invention allows mobile agents to execute on network nodes and access node and network resources through services. Resources may be any data structure, function, or physical component to which a node allows access. For example, a resource may be the ability to create and alter files; such a resource is normally provided by an operating system. A resource may be a port, the ability to send Simple Network Management Protocol ("SNMP") messages, the ability to access parts of the operating system, the ability to access incoming or outgoing traffic, or the ability to execute a native code (e.g., machine code) component. A resource may also be the ability to output information to a display (e.g., a CRT or flat panel display), produce sounds, or accept keyboard or pointing device input.

In an exemplary embodiment of the present invention, a proactive environment exists on multiple nodes in a network; one proactive environment exists on each node which may support a proactive environment. Each proactive environment can create agents (and is thus the agents' "launch point"), provides a platform allowing agents to run, allows agents access to resources through services, monitors and controls agents, allows agents to travel via the network to other proactive environments, may receive agents transmitted from other proactive environments, and in addition may perform other network administration functions. A proactive environment enables an agent to execute on one node, stop execution, transfer to another node, and resume execution.

In an exemplary embodiment, an agent may access certain resources only if it has permission to do so. Services are used to allow agents restricted access to resources by acting as intermediaries between the agents and the underlying resources. Services may allow access to resources (e.g., a routing table) or may emulate the function of resources (e.g., executing code in a certain language). For example, a service altering a routing table may accept a routing table entry to be altered. Security is provided, as agents require permissioning to use services, and services may constrain access to resources. Permissioning is achieved by having each agent carry with it an access control list which is a permission list determining which services it may access, and other security information. Services may grant access to resources in a node, platform, and application independent manner.

In an exemplary embodiment services may be circumscribed, or may be tailored based on agent permissioning. Services may be circumscribed in that a service may allow access to only a portion of an underlying resource. Services may be tailored in that a service may allow access to only portions of underlying resources based on agent permissioning—different agents, having different permissioning, may be able to access different aspects of resources.

Referring to the figures in which like numbers indicate like elements, FIG. 1 is a block diagram illustrating a network node 30 according to an embodiment of the present invention. Node 30 may be a standard personal computer or another type of data processing device, and in addition, may include components not traditionally found in a standard personal computer. Node 30 is a device connected to a network 4 via network communications device 130. Node 30 includes proactive environment 100, which includes services 102, 104, 106 and 108 and which provides an environment on which agents, such as agent 110, may run. Node 30 includes operating system ("OS") 5, providing overall control of node 30; Java™ virtual machine ("JVM") 3, providing a platform on which proactive environment 100 operates; and management console application 9, providing a user interface for monitoring and control of proactive environment 100 and other entities. Node 30 includes applications 11 and 13, providing functionality, such as word processing, to a user. Services 102-108 provide agent 110 access to resources, such as access to network 4, OS 5, or other resources.

Network 4 provides connectivity and communications with other networks (not shown) and with other network nodes (not shown). Network communications device 130 allows node 30 to connect to network 4 via links 60 and 62, which connect to other nodes in network 4 (not shown). Network communications device 130 includes ports 21 and 23, which translate signals between the formats and methods used by links and those used by nodes (e.g., between an analog format used by a link and a digital format used by a node), and which possibly perform other functions.

Configuration and control of node 30, agent 110, services 102-108, and also of other nodes, agents, and services which may exist on nodes which are part of network 4 may be accomplished through management console application 9, which allows a human operator to communicate with, monitor, and send commands to proactive environments and other entities.

In an exemplary embodiment of the present invention proactive environment 100 creates agents, provides a platform allowing agents to run, monitors and controls agents, allows agents to travel via network 4 to other proactive environments, may receive agents transmitted from other proactive environments, and in addition may perform other functions. Proactive environment 100 interfaces with a human operator using management console application 9. Proactive environment 100 is a Java™ object which runs on JVM 3, itself a program running on node 30. Proactive environment 100 is implemented as an extension of the Voyager™ system, which defines a Java™ program allowing agents to operate. Alternate embodiments of the system and method of the present invention may use alternate forms of the proactive environment described herein, or may not require the use of a proactive environment.

In an exemplary embodiment proactive environment 100 provides an interface to agent 110 including services 102-108. Services 102-108 are Java™ classes which may be instantiated as objects which run on the JVM 3; the objects contain methods which accept inputs from agents and allow agents access to resources. Services are members of a proactive environment; services 102-108 are members of proactive environment 100. Agent 110 may access services 102-108 by requesting proactive environment 100 to instantiate a service object; the agent then may invoke methods of the service object, which are Java™ methods. Services may, if so created, have access to any resource on node 30 or network 4 to which JVM 3 itself has access, e.g., file creation, SNMP messages, routing tables, or display output.

Figure 2:
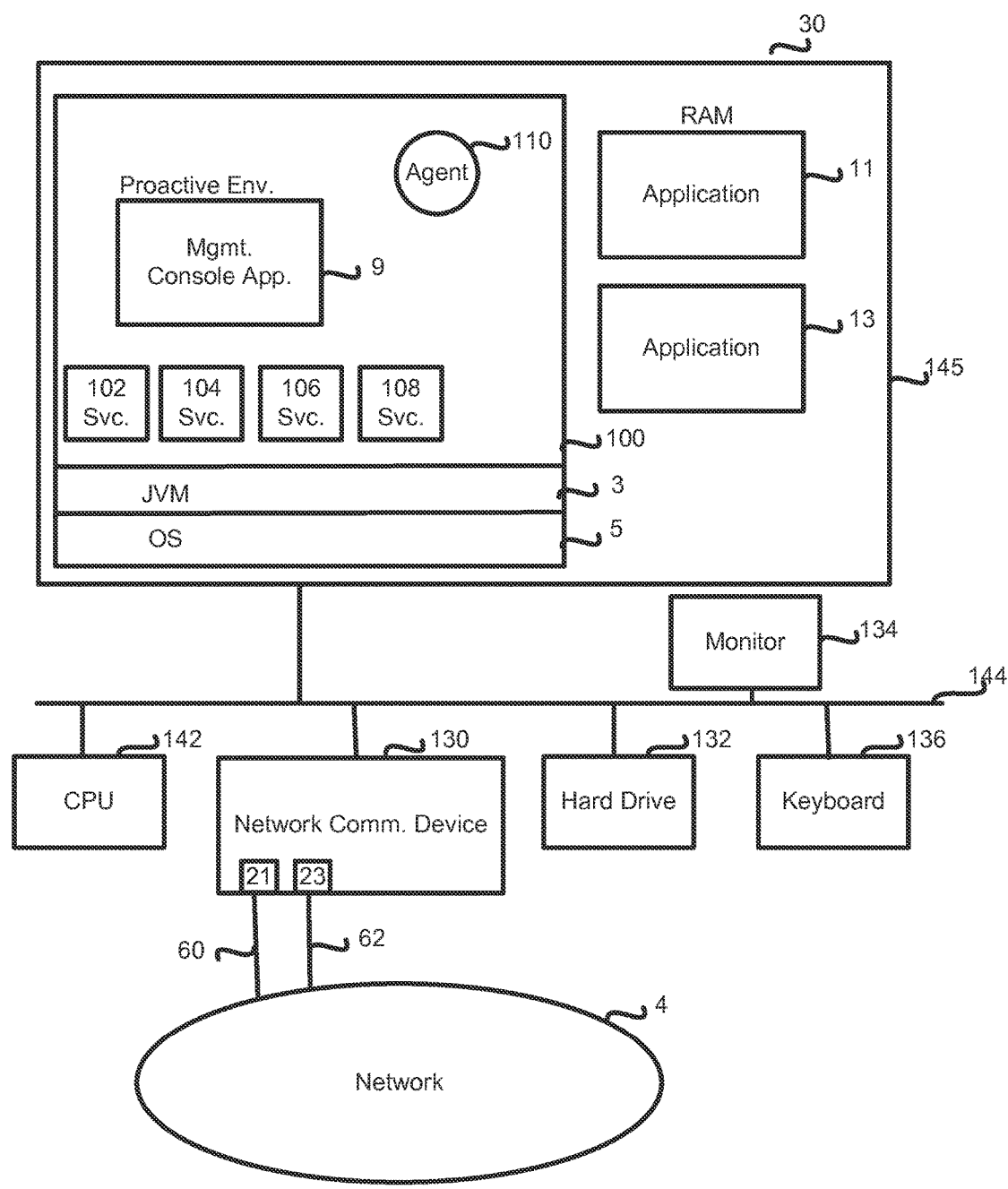
FIG. 2 is a block diagram illustrating the node of FIG. 1 according to an embodiment of the present invention.

FIG. 2 is a block diagram illustrating node 30 of FIG. 1 according to an embodiment of the present invention. FIGS. 1 and 2 illustrate node 30 from different aspects; thus like numbered components are identical in function and structure. Node 30 includes a central processing unit ("CPU") 142 connected to a system bus 144. CPU 142 executes instructions and controls the operation of node 30. CPU 142 may be, for example, a Pentium® processor available from Intel® Corp. System bus 144 allows the various components of node 30 to communicate, and may alternately include a plurality of busses or a combination of busses and bus bridge circuits. Node 30 further includes RAM 145, providing non-permanent storage of data and program instructions; and a plurality of peripheral devices 130, 132, 134, and 136, including keyboard 136, allowing user input; network communications device 130; hard disk drive 132, allowing for long term storage of information; and monitor 134, displaying information to a user. Node 30 may include other peripheral devices not shown, such as a printer or a mouse. Node 30 includes OS 5, JVM 3, management console application 9, agent 110, proactive environment 100, services 102, 104, 106 and 108, and applications 11 and 13. Services 102-108 provide agent 110 access to resources, such as access to network communications device 130, hard disk drive 132, monitor 134, OS 5, or other resources. A portion of application programs 11 and 13, proactive environment 100, services 102-108, agent 110, JVM 3, management console application 9, and OS 5 are stored in RAM 145, are executed by CPU 142, and to an extent control the operation of node 30 in cooperation with other components such as CPU 142.

Network communications device 130 allows node 30 to connect to network 4 via links 60 and 62, which connect to other nodes in network 4 (not shown). Network communications device 130 includes ports 21 and 23, which translate signals between the formats used by links and those used by nodes, and which possibly perform other functions.

Figure 3:
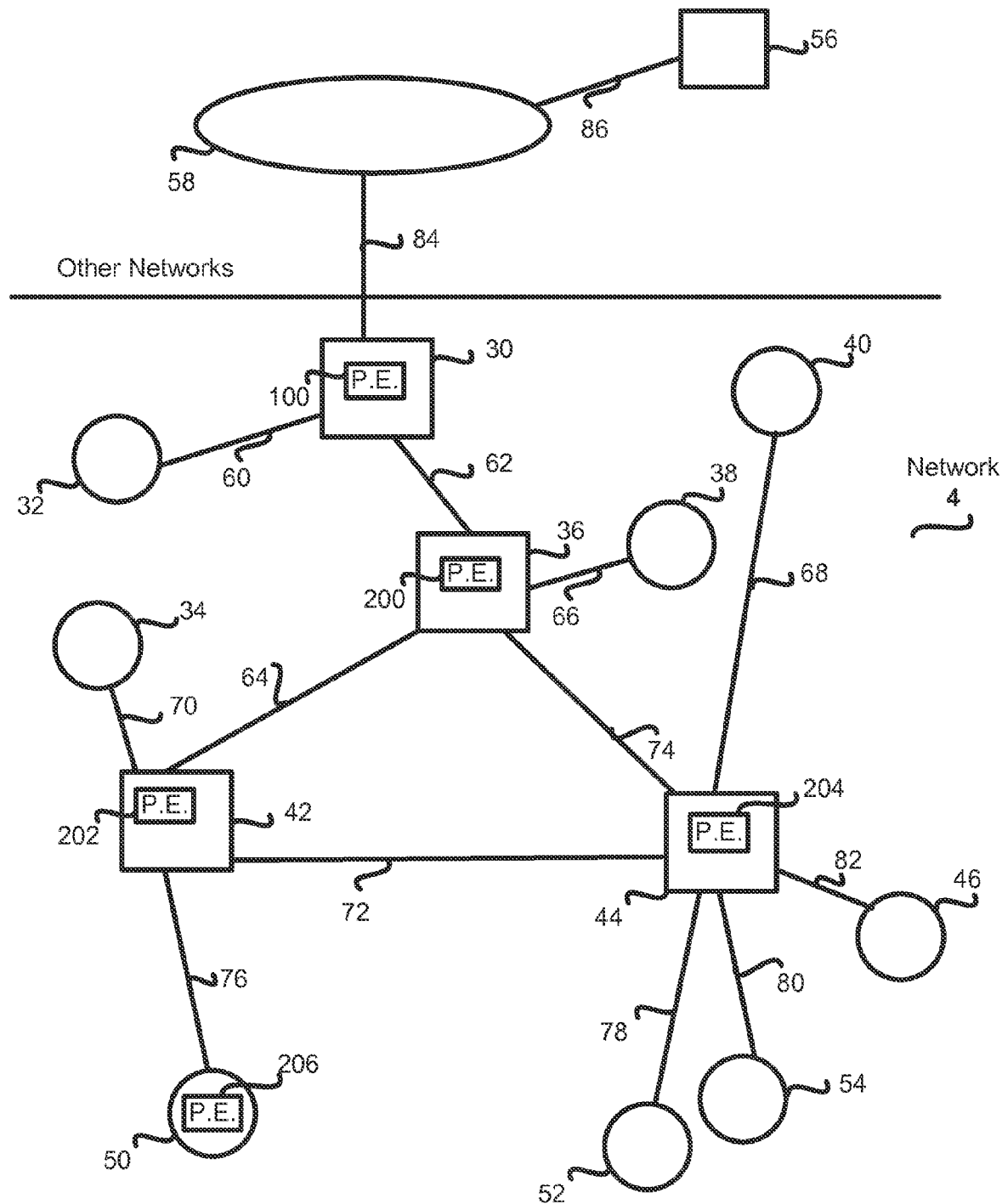
FIG. 3 is a block diagram illustrating the network of FIG. 1 according to an embodiment of the present invention.

FIG. 3 is a block diagram illustrating network 4 of FIG. 1 according to an embodiment of the present invention. In an exemplary embodiment network 4 includes nodes 30, 32, 34, 36, 38, 40, 42, 44, 46, 50, 52 and 54 providing user functionality, routing traffic, providing network security, and performing other functions; and links 60, 62, 64, 66, 68, 70, 72, 74, 76, 78, 80 and 82, connecting and transmitting data between nodes 30-54. Links 60-82 may be, for example, coaxial cable, twisted pair cable, or fiber-optic cable, but can be any transmission medium capable of transporting traffic. In alternate embodiments, the system and method of the present invention may work with networks having a structure other than that described.

Node 30 is a gateway, providing network 4 access to other networks, such as the Internet 58, and acting as a firewall. Link 84 transmits data between node 30 and other networks, such as Internet 58. Nodes 30-54 may use other networks such as the Internet 58 to access information and services provided by processes on remote nodes, such as node 56. Node 56 connects to the Internet 58 via link 86, which may be coaxial cable, twisted pair cable, fiber-optic cable, or any other transmission medium. Nodes 30, 36, 42 and 44 are routers, accepting traffic and routing the traffic to destinations, or to other nodes which then forward the traffic to destinations. Nodes 32-54 are PCs, supporting applications and providing functionality to users, such as word processing functionality. Nodes 30 and 50 support management console applications. Management console application 9, supported by node 30, is depicted in FIG. 1; for the sake of clarity the management console application on node 50 is not depicted. While nodes having certain definitions and functions are depicted, the nodes of network 4 may be any devices, for example, workstations.

Nodes 30, 42 and 50 maintain proactive environments 100, 202 and 206, respectively. Each node on which agents may execute maintains a proactive environment. In an exemplary embodiment of the present invention all nodes which are involved in network functions (e.g., routers, firewalls, management devices) and which may support a mobile agent environment such as a proactive environment do so (some nodes on a network may not have the ability to support a proactive environment). Some nodes not involved in network functions, such as PCs providing user functionality, may also support a mobile agent environment.

Nodes 30-54 may communicate using the physical network (i.e., links 60-82 and nodes 30-54) and various layers of protocols. Similarly, objects, such as agents and proactive environments, and applications, may communicate using network 4 and various protocols. Such methods are well known in the networking art.

One method for allowing network nodes or modules on nodes to communicate is the TCP/IP transport protocol. Every node connected to a network using TCP/IP has an internet protocol ("IP") address, four numbers separated periods. This IP address may be used to name the node. Some nodes may have more than one IP address.

Each proactive environment on network 4 may create agents, provides an operating environment for agents, allows agents to migrate among nodes which are part of network 4, may monitor and control agents, and provides agents access at each node to a certain set of resources. An agent existing on a proactive environment on one node of network 4 may move to a proactive environment on another node. For example, an agent running on node 30 may move, via links 62 and 64, to node 42. Proactive environments and agents communicate with other proactive environments or agents, both within a node or across a network, using a service which transmits messages. The service uses a remote procedure call ("RPC") system, defined by the Voyager™ system. Messaging techniques using RPC methods are known.

In an exemplary embodiment an agent is instantiated by a proactive environment using the Java™ language "new" keyword; a variable referencing the agent is returned to the proactive environment. Each proactive environment and instantiated agent has a unique name, stored as a string. Each instantiated agent may be referred to initially by the local variable used to refer to the object when it is created. Each agent may be referred to globally by its agent name.

In an exemplary embodiment of the present invention, the various types of agents which carry out the functionality of the system and method of the present invention are mobile Java™ objects which may run within a proactive environment. Proactive environments may be hosted on devices running a JVM. A base "agent" object class provides an agent with basic functionality, such as the ability to migrate from node to node, permissioning capability, the ability to communicate with proactive environments and other agents, and the ability to use services. Additional capabilities may be provided by creating subclasses of the agent base class. Each type of agent is given unique functionality in addition to the functionality provided by a base class or an enhanced base subclass (e.g., the ability to function as a firewall) by adding a work object (a Java™ object) and possibly one or more worksheets (objects containing Java™ language code or code in another language). A subclass of the agent base class includes methods to add a work object and worksheets to instantiated agents.

When an agent begins execution at a node, a controlling method (the first method to be started when an agent is invoked) executes the work object; the work object may invoke a worksheet. A work object may invoke a different worksheet at each different node or may invoke the same worksheet at each node. A work object may have only one worksheet available, and thus may not make a choice based on a current node, or may not use worksheets. In an exemplary embodiment worksheets are objects which are members of an agent. A worksheet may be a Java™ language worksheet or a non-Java™ language worksheet. A work object invokes a non-Java™ language worksheet by passing the object to a service, which emulates the running of the worksheet in the language of the worksheet. A Java™ worksheet is executed by calling the worksheet. Creating a base class and enhancing its features with additional functionality by creating subclasses is well known in the Java™ language and object oriented programing arts.

After an agent is instantiated, a work object and worksheets which provide unique functionality may be added to the agent by invoking a method which is a member of the agent. The method is passed the work object and worksheets.

In an alternate embodiment each type of agent is given unique additional functionality by adding class members (methods and variables) to the base agent class definition; each type of agent is a subclass of the agent base class. Alternate embodiments may provide different methods for varying functionality of agents. For example, work objects and worksheets may be created using different methods, or may not be used.

Referring to FIG. 3, an agent according to an exemplary embodiment of the present invention is capable of executing on a mobile agent environment (specifically a proactive environment) installed on one node of network 4, stopping execution, transporting itself along with state information to a mobile agent environment on another node of network 4, and resuming execution. In an exemplary embodiment the state includes information contained in members of the agent, such as data, a work object, worksheets, and an access control list. However, in alternate embodiments an agent's state may include any data created when an agent is instantiated or after an agent is instantiated, for example associated information stored as agent members, or the point at which the agent stopped execution, possibly in the form of an instruction pointer.

In an exemplary embodiment of the present invention, an agent moves by invoking a move method of the agent, defined in the agent base class, which accepts a location (in the form of a string) referring to a destination proactive environment. The agent's move method calls a move method of the proactive environment on which the agent executes. The proactive environment in turn moves the agent object by halting the agent and transmitting its code and data via the network to the target proactive environment. The proactive environment uses Java™ serialization to serialize the agent, storing all agent member variables in a file or in RAM. This data is transmitted to the destination proactive environment as a buffer of bytes along with the agents's code, which is stored in the form of a Java™ .class file. Agent information is encrypted before it is sent and decrypted by the receiving proactive environment. The receiving proactive environment uses Java™ methods to load the agent based on the .class file and instantiate the agent's members based on the received agent data. The receiving proactive environment determines from the agent's access control list if the agent has permission to execute. If, according to the access control list, the agent does not have permission to execute on the proactive environment, the proactive environment which launched the agent is informed; if that proactive environment launched the agent due to a command from another application (e.g., a management console application) the proactive environment may inform that application.

If the agent does have permission, the proactive environment starts executing the agent by calling the agent's controlling method. The controlling method starts the operation of the agent. The controlling method may invoke the work object to operate the agent or may operate the agent itself. The work object may then in turn call a worksheet. The work object may query the proactive environment for the proactive environment's name and, based on this name, determine which worksheet is to be invoked. Alternate methods of moving agents may be used.

Figure 4:
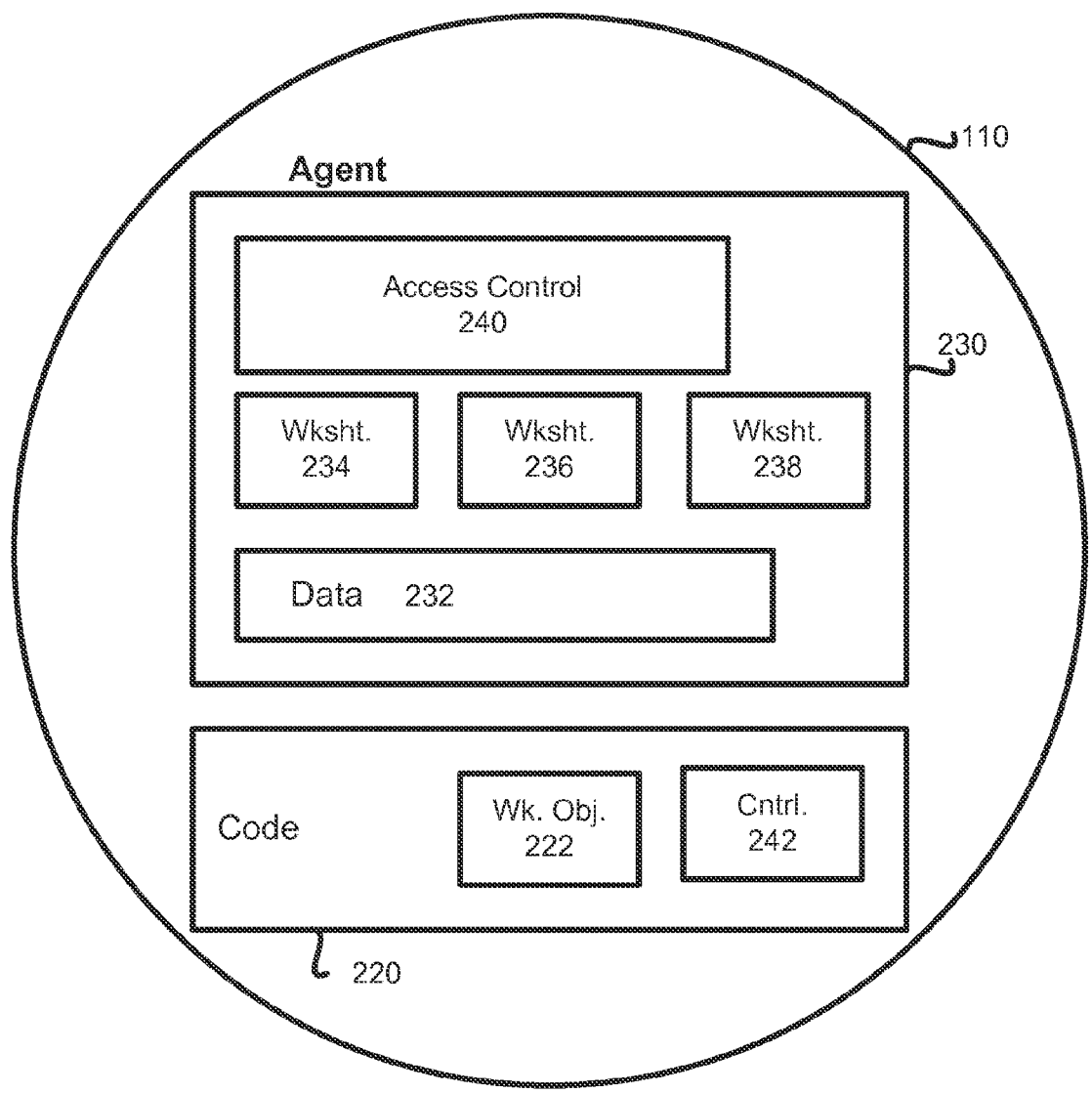
FIG. 4 is a block diagram illustrating the instantiated agent of FIG. 1 according to an embodiment of the present invention.

FIG. 4 is a block diagram illustrating instantiated agent 110 of FIG. 1 according to an embodiment of the present invention. In an exemplary embodiment agent 110 includes code segment 220, which is comprised of Java™ methods which are members of agent 110 and which provide functionality to agent 110; and state 230. Code segment 220 includes work object 222, providing functionality to agent 110. State 230 includes worksheets 234, 236 and 238; work object 222 may use worksheets 234-38 to provide functionality to agent 110. Worksheets 234-38 are members of agent 110 which may be Java™ or non-Java™ language code segments. Worksheets 234-38 may perform tasks such as accessing incoming traffic or sending packets. Worksheets 234-38 may use services to perform some tasks. Code segment 220 includes a controlling method 242, the first method invoked when agent 110 is started on a node, which may contain code controlling agent 110 and executing work object 222. Controlling method 242 controls the overall operation of agent 110; controlling method 110 may invoke other methods of agent 110 or other methods made available by the proactive environment or JVM on which agent 110 executes (not shown).

State 230 includes access control list 240, a list determining, for agent 110, which services may be used on which devices, how those services may be used, and on which devices agent 110 may be run. State 230 includes data segment 232, which contains run time data agent 110 may have instantiated. Access control list 240, work object 222, data 232 and worksheets 234-38 are variables which are members of agent 110. A variable may represent an object, as in the case of work objects. Access control list 240 lists devices on which agent 110 may execute, and for each device the services and, in some cases, capabilities within services, which agent 110 may use on that device. Agent 110 may only execute on the devices listed in access control list 240. Alternate embodiments may provide other methods and structures for recording permissioning of agents. Alternate embodiments may provide a different structure for agents.

Agent 110 may execute in several modes, where each mode dictates how agent 110 may act; if so, the mode in which agent 110 exists is recorded as a variable in state 230.

In an exemplary embodiment, to ensure the integrity and source of agent 110, when it is transmitted across the network by a transmitting proactive environment it is signed using a digital signature and encrypted. Only authorized entities may decrypt, access and execute agent 110. A proactive environment receiving agent 110 may use the digital signature to ensure the integrity and source of agent 110. Encryption and verification methods are well known. Alternate embodiments may provide other methods for encrypting or protecting agents' data.

In alternate embodiments other methods may be used to create the agents used with the present invention, and the agents used with the present invention may have alternate structures. For example, alternate embodiments may not require agents functioning as ALGs to have a controlling method, work objects or worksheets. In alternate embodiments the agents of the system and method of the present invention may be implemented using tools other than the Java™ language and the Voyager™ system, such as C++, or a system not having object oriented capability.

A typical JVM allows certain Java™ objects to execute in a "sandbox," and does not allow these objects to have access to resources outside the sandbox. Agents, Java™ objects running inside the sandbox, may access resources outside the Java™ sandbox through services. In an exemplary embodiment services are classes defining objects which contain methods accepting inputs from agents and allowing agents access to resources. The objects are Java™ objects running on the JVM.

In an exemplary embodiment an agent calling a service makes a request for the service to the proactive environment on which the service runs. The proactive environment accesses the agent's access control list to determine if, and to what extent, the agent may access the service. Certain services (and thus the underlying resources) may only be accessed by agents which have the proper permissioning. The proactive environment creates an object which is an instance of the service. If the service may be created so as to provide various levels of capabilities based on permissioning, variables, members of the service object, are set to indicate which aspects of the service the agent may access; this is done per the agent's access control list. In such a case the service methods provide access to resources only if associated variables, indicating permissioning, are properly set. Instantiated services provide methods which accept input from agents and may return output to agents. The service object is passed to the agent, which may call methods of the object to access the underlying resources. When used herein, service may refer to the class defining a service or to an object instantiated based on that service class. Furthermore, an agent accessing or calling a method within a service object may be said to be accessing or calling that service. In alternate embodiments a service may be any system or module allowing an agent to access resources.

A service method may pass data back to a calling agent as a return value, in the manner typical of method or function calls; event handling may also be used to pass data between services and agents.

In one embodiment of the present invention services may grant access to remote nodes. Services may grant access to devices which do not support a proactive environment. A proxy device, a node which can support a proactive environment, may allow an agent access to a node which cannot support a proactive environment (a "legacy device") or to a node which can and does support a proactive environment. An agent may manage devices via services which are provided on a proxy device which can be used to monitor or control managed devices via, for example, SNMP or command line interface (CLI). For example, an agent may access a routing table on a device other than the device on which the agent functions through the use of a service, whether or not the remote device supports agents.

Figure 5:
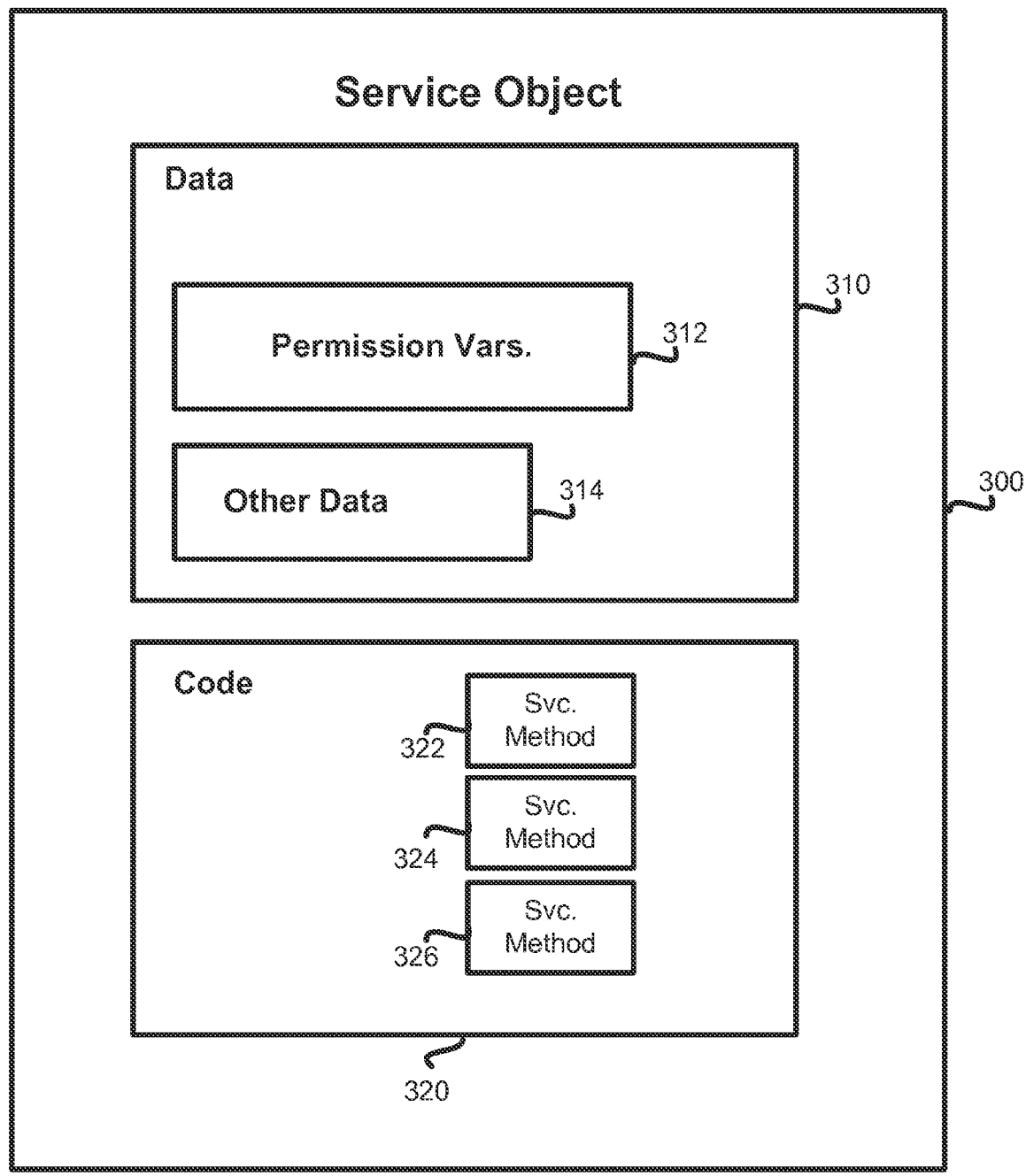
FIG. 5 is a block diagram illustrating a service object instantiated from a service of FIG. 1 according to an embodiment of the present invention.

FIG. 5 is a block diagram illustrating a service object instantiated from service 102 of FIG. 1 according to an embodiment of the present invention. Service object 300 is a Java™ object instantiated from service 102, a class defining a Java™ object. Service object 300 is instantiated for the use of one particular agent, and allows that agent access to a resource. Service object 300 includes data segment 310 and code segment 320. Data segment 310 includes permission variables 312, members of service object 300 which indicate which methods an agent may access and thus to what extent an agent may access the underlying resource. Data segment 310 includes other data 314, which may be necessary for the operation of service object 300. Service object 300 includes code segment 320, which includes methods 322, 324 and 326, allowing agent access to aspects of the underlying resource. Methods 322, 324 and 326 are Java™ language methods. However, service object 300 may include or access non-Java™ language native code—for example, machine code.

Figure 6:
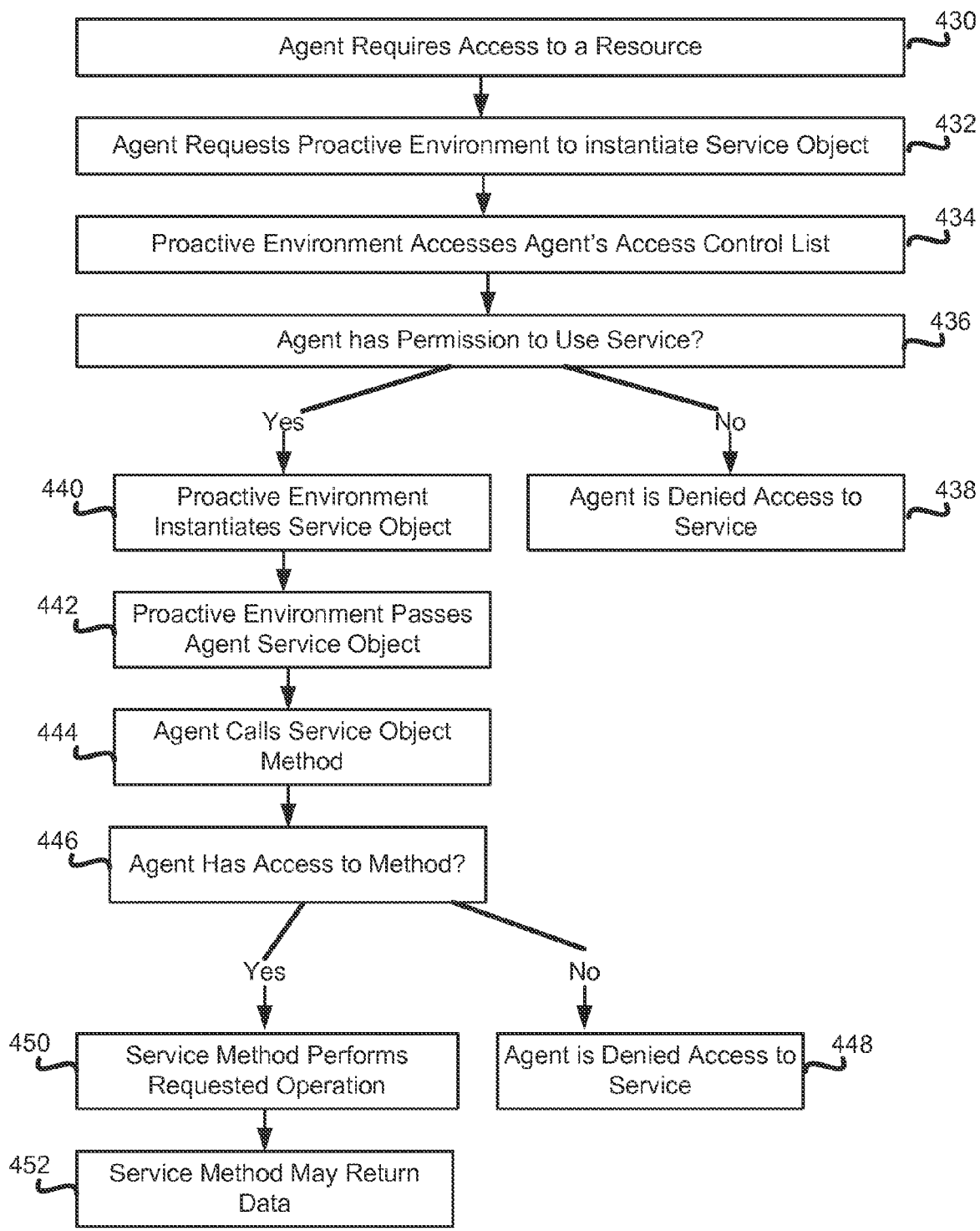
FIG. 6 is a flow chart illustrating the interaction between the instantiated agent and a service of FIG. 1 according to an embodiment of the present invention.

FIG. 6 is a flow chart illustrating the interaction between instantiated agent 110 and service 102 of FIG. 1 according to an embodiment of the present invention.

Referring to FIGS. 1, 4, 5 and 6, in step 430 agent 110 requires access to a resource. For example, agent 110 needs to transmit an IP packet. Service 102 provides agents with the ability to transmit IP packets, according to an agent's permissioning.

In step 432 agent 110 requests proactive environment 100 to instantiate an object defined by service 102.

In step 434, proactive environment 100 uses methods to read access control list 240 of agent 110.

In step 436, proactive environment 100 uses access control list 240 to determine if agent 110 is an agent which has permission to use service 102 on node 30. If agent 110 does not have permission, proactive environment 100 proceeds to step 438. If agent 110 does have permission, proactive environment 100 proceeds to step 440.

In step 438, agent 110 is denied access to service 102.

In step 440, proactive environment 100 instantiates service object 300 based on the class of service 102. Proactive environment 100 configures service object 300 per the permissioning accessed in step 434. For example, one set of permissioning may allow agent 110 to use service object 300 to read packets transmitted to agent 110, and another set of permissioning may allow agent 110 to use service object 300 to both read packets and transmit packets. Proactive environment 100 sets permission variables 312, members of service object 300, to indicate which aspects of service 102 (in the form of methods 322-326 of service object 300) agent 110 may access.

In step 442, proactive environment 100 passes agent 110 service object 300.

In step 444, agent 110 uses service object 300 by calling one of methods 322-326. For example, if agent 110 calls an IP send method, requesting service 102 to allow agent 110 to allow agent 110 to transmit an IP packet, agent 110 passes the service method inputs describing the IP address and destination port, and the data to be transmitted.

In step 446, the called method determines if agent 110 has access to the particular method requested. If agent 110 has access to the method, per one or more of permission variables 312, the method proceeds to step 450. If agent 110 does not have access to the method, the method proceeds to step 448.

In step 448, agent 110 is denied access to service 102.

In step 450 the service method performs the operation requested by agent 110. For example, the method transmits the packet requested by agent 110. Service methods 322-26 are Java™ methods providing access to node 30 and network 4, via JVM 3 and OS 5; the methods are not restricted by the sandbox model.

In step 452 the requested service method may return data to agent 110. For example, in the case of transmitting a packet, the service method may return a success or failure code; the service method returns the data as the return value results of a function call.

III. Operation

An exemplary embodiment of system and method of the present invention provides for a mobile agent which may be sent to a device to function as an ALG. In order to function as an ALG, the mobile agent may be required to reconfigure the network routing topology so that only certain traffic is routed to the agent ALG. To do so, the agent may alter the routing tables of route devices. Route devices are devices which may route traffic based on information such as the destination, source or type of the traffic. In an exemplary embodiment the route devices affected may include, for example, routers, layer 3 switches, IP switches, or any device which routes or alters the path of network traffic based on layer 3 information. In alternate embodiments the route devices affected may include other kinds of network elements, for example, switches or hubs.

In an exemplary embodiment, the agent ALGs of the system and method of the present invention may function an order of magnitude slower than dedicated network equipment such as a router or a switch. In such a case, only traffic which is likely to be modified by or otherwise required by the ALG ("relevant traffic") should be passed to the ALG. At the time the ALG is installed, the network routing topology may be altered. An exemplary embodiment of the system and method of the present invention provides that an agent ALG, as part of its launch, alters the traffic routing configuration of route devices in the network topology. When used herein, relevant traffic may be traffic having content relevant to the function of the ALG; for example, traffic destined for a process which is a client process of an ALG, and which the ALG manipulates or modifies.

Typical ALG functionality involves acting as an intermediary, filtering or caching data transmitted between a source process and client processes. The source process is typically a remote process on a remote device (a "source device"). For example, a source process may be a web server or media streamer operating on a remote device.

When ALG functionality is required at a device, an agent ALG is launched. In an exemplary embodiment, the agent ALG is launched by first being created and configured. An agent ALG may be created and configured in a number of manners.

In an exemplary embodiment, a user operating a management console application at a device running a proactive environment instantiates an ALG which has a certain functionality, executes at a certain device, has a list of clients, and has network routing configuration information. The device at which the agent ALG is created may or may not be the ALG node. The proactive environment at the device used to create the agent ALG instantiates an agent. The functionality for the agent is provided by the work object and one or more worksheets provided to the agent ALG. The proactive environment selects the work object and worksheets based on the type of functionality of the agent—for example, firewall, web cache, etc. For example, a work object in combination with one or more worksheets may provide firewall functionality according to known or novel methods. It is known in the art to provide firewall functionality. In alternate embodiments, using other structures for agent ALGs, functionality may be provided to agent ALGs in different manners.

Configuration data required for the agent ALG (e.g., its ALG node, its list of clients, and network routing configuration information) may be provided to the agent ALG as data within a worksheet. The proactive environment uses methods of the instantiated agent to add the work object and one or more worksheets to the agent ALG. In an alternate embodiment other configuration information may be used for the agent; for example, the agent ALG may be directed to process only a certain type of traffic or traffic from certain source processes. Furthermore, such configuration data may be stored at an agent ALG in different manners.

Alternately, the agent may be launched by other methods. For example, a module operating in conjunction with a proactive environment may decide to configure and deploy an agent ALG, and may carry out the required operations automatically, without the initiation or guidance of a network operator. In addition, an instantiated agent ALG may exist and be stored on a device, awaiting a user command for its configuration and launch or a system condition which results in its automatic launch.

If the agent ALG is not launched from the ALG node, it uses its move method to move across the network to the ALG node. The ALG node may be positioned anywhere in a network, but, in an exemplary embodiment, is positioned relatively directly between the ingress point (the network node which is the source of the relevant traffic—e.g., a gateway) and the clients of the agent ALG, and in addition relatively close to route devices which may divert traffic to the agent ALG. For example, referring to FIG. 3, an agent ALG may be deployed to node 42, which acts as an ALG node. Node 42 is connected directly (i.e., one hop away) to node 36, acting as a route device. Further, if relevant traffic enters network 4 at node 30 (which is the ingress point for the relevant traffic) and clients are located at nodes 46, 52 and 54, node 42 is downstream (with respect to the relevant traffic) from node 30, but upstream from the clients. When used herein, upstream may refer to a position or direction in a path of traffic which is towards the source of traffic, when the traffic is being sent from a source to a client. Such a definition is not affected by the fact that the client may be sending traffic, such as commands or requests, in an upstream direction to the source. Similarly, downstream may refer to a position or direction in a path of traffic which is towards the client, when the traffic is being sent from a source to a client. The ingress point for the relevant traffic is typically a gateway to another network or the Internet. Thus in an exemplary embodiment the agent ALG is positioned near a route device which is between the relevant clients and the ingress point for the relevant traffic. In alternate embodiments an agent ALG may be placed in other positions in a network.

In an exemplary embodiment, the agent ALG alters routing information on the network so that relevant traffic is diverted to the agent ALG. If relevant traffic is a subset of traffic destined for client devices supporting client processes (because client devices support processes in addition to client processes), the relevant traffic may be identified by its destination IP address. Such identification may be over inclusive. Relevant traffic may be identified with a finer granularity if route devices permit. For example, the destination network port may be used to identify traffic destined for client processes rather than client devices. In alternate embodiments relevant traffic may be identified in other ways. For example, the content of the traffic may be filtered for by route devices; the content of traffic may be identified in several ways, depending on the sophistication of the route devices. Certain types of traffic are often directed to specific network ports—e.g., video data is customarily directed to a certain port on a certain device. Due to the granularity of the routing ability of route devices, traffic in addition to relevant traffic may be diverted to an ALG node.

In an exemplary embodiment, one route device is altered—the route device nearest (in the network topology) to the ALG node, where the route device is also between the ALG node and the ingress point. The route device selected to be altered may be adjacent to the ALG node—i.e., one hop away in the network topology. The agent ALG requires knowledge of the network topology to make such routing table alterations. The agent ALG uses a service to alter the routing table for the selected route device so that relevant traffic is re-routed to the agent ALG. The service may alter the routing table using, for example, SNMP or CLI, or by other methods. The agent ALG may record route entries of route devices before the entries are altered, so that the entries may be restored if the agent is uninstalled or modified.

To divert relevant traffic to the agent ALG, entries for each client device in the routing table of the route device selected to be altered are modified to cause traffic for the client device to be sent to the ALG node instead of the client device. Each client device entry is referenced by the IP address of the client device. Modifying routing tables to reroute traffic is well known in the art. If the route device or devices altered can route based on port numbers, the granularity of the routing can be improved. In such a case the altered routing tables may direct that only traffic having a destination IP address and destination port number which match a client process (as opposed to merely the IP address of a client device) be redirected to the ALG node.

The list of client devices for the agent ALG and identifying information for client processes of the agent ALG (such as the ports that the client processes use) are included with the configuration information for the ALG. Such information may be provided by a network administrator when configuring the agent ALG. In alternate embodiments, an agent ALG need not have a set list of client processes. For example, the agent ALG may process all of a certain class of traffic, then forward the traffic on to its destination. In such a case, traffic is rerouted to the agent ALG based on the class of the traffic, rather than the destination of the traffic. In a further embodiment, an agent ALG may create a list of clients by altering a route device so that traffic directed to a particular server is directed to the agent ALG, and then analyzing such traffic to determine which processes make requests to the server.

In alternate embodiments route devices having other locations may have routing information modified, and more than one route device may be so altered. For example, a route device may be altered which is not the nearest route device to the agent ALG which is also between the ingress point and client devices. This may be accomplished by configuring the altered router to tunnel the traffic to the ALG rather than to forward it using default mechanisms. If more than one ingress point provides relevant traffic, more than one route device may need to be altered, and more than one agent ALG may be deployed. If an agent ALG needs to intercept information sent from a client process to a source process, route information for one or more route devices may be altered.

In an alternate embodiment, other techniques may be used to route traffic to the agent ALG. For example, a routing agent may be installed on a node to redirect traffic, or the processes involved (i.e., the client processes and the source process) may be altered or augmented to address traffic to the agent ALG. An agent ALG may use any combination of routers, switches and hubs to access relevant upstream or downstream traffic. Furthermore, in some embodiments, it is not required that traffic be rerouted for agent ALGs to function.

In an exemplary embodiment, most traffic which is not relevant traffic is not redirected to the agent ALG, and is routed to its proper destination. However, due to the granularity of the route information, some non-relevant traffic may be redirected to the agent ALG. For example, traffic from a remote process other than the source process, which is destined for the client process may enter the network from a gateway and be rerouted by a router to the agent ALG; all such traffic may not be relevant. Thus, agent ALGs may include logic to filter each received packet for relevancy. Such logic may determine if the packet should be processed by the agent ALG or should be forwarded without processing. Filtering may be based on, for example, source address, destination port number, content, or other information. The agent ALG retransmits non-relevant packets to their proper destination.

In an exemplary embodiment the agent ALG reconfigures certain modules on the ALG node so that the traffic diverted to the ALG node is received by the ALG process. The agent ALG is provided with configuration information to determine which traffic should be intercepted. Each packet of the diverted traffic has a destination IP address and port. The IP address, and possibly the port, do not correspond to the agent ALG. Since the agent ALG does not execute on the node having the IP address (and in addition, possibly, on the port) of the diverted traffic, when such traffic is sent to the ALG node it is not automatically passed to the agent ALG. The agent ALG may cause such traffic to be passed by the OS to the agent ALG when sent to the ALG node. In an exemplary embodiment, to do so, the agent ALG uses services to interface with the operating system of the ALG node to capture some portion of the packets received at the ALG node. The agent may interface with standard tools available with current operating systems, for example, the raw IP sockets available with Windows NT™ 4.0. For example, the agent ALG may create a socket which enables it to receive packets. The agent ALG may receive all packets sent to the ALG node, filter for the packets of relevant traffic, and forward the remaining packets to, for example, the OS of the ALG device or to another device. The socket may enable some filtering so that a higher proportion of packets sent to the agent ALG constitute relevant traffic. Filtering may be performed using the IP address of the traffic, and possibly the destination port and other information. In alternate embodiments, other methods may be used to divert traffic received at an ALG node; in further embodiments, agent ALGs are not required to divert or capture such traffic.

After receiving the rerouted traffic, the agent ALG processes the traffic according to its ALG functionality and passes the processed data to the client process. The agent ALG may function according to known methods (e.g., a media transcoder or a web cache) or according to methods not yet developed. The agent ALG of the system and method of the present invention may perform various ALG functions. An agent ALG typically receives large amounts of data from a relatively remote source. The data may be processed by the agent ALG then forwarded on to a client. For example, a remote source transmits traffic to a client process. The traffic enters the network of the client process via a gateway, and eventually reaches a route device which has had its routing tables modified by the agent ALG. The ingress point and modified route device may be the same device. The packets of data (which may be identified by their destination IP address and possibly destination port and other information) are diverted, and transmitted to the ALG node instead of to the client device. Mechanisms of the OS of the ALG node deliver the relevant packets to the agent ALG, which may filter received traffic for relevant traffic. The agent ALG, using its work object and/or its worksheet, performs the relevant transform on the data. The packets are transmitted onward to the client node and thus the client process. This may be accomplished, for example, using a service which allows an agent to send network traffic.

In alternate embodiments relevant traffic may be identified by source address, if route equipment in the network has such a capability. An agent ALG may identify the address of the relevant server or servers through configuration information, or by intercepting request packets sent by client processes, which contain as their destination address the IP address of the source.

Certain ALG functionality may not require a constant stream of data from a source process. For example, the stream of data sent from the source process and intercepted by the agent ALG may be intermittent compared to the stream of data sent by the agent ALG to the client process. A web cache agent ALG may send a stream of web pages to a client process and may itself request data from a source process only when the web cache agent ALG does not have a web page which is requested by the client process.

In an exemplary embodiment an agent ALG may be uninstalled, and may be destroyed or may move to another device. A system administrator may issue a command using, for example, a management console application, which causes the agent ALG to be uninstalled and either be destroyed or move to another location. The capability to quickly and easily uninstall the agent ALG of the present invention allows for the resources supporting the agent ALG (e.g., the device on which the agent ALG executes) to be used more efficiently. When an uninstall command is issued the agent ALG resets the routing tables which were altered when the agent ALG was installed and removes any OS configuration which allowed it to divert traffic at the ALG node (for example, a socket). The agent ALG uses information recorded when the routing tables and OS configurations were originally altered to make these changes. The agent may be destroyed. In addition, the agent may use its move method to move to a different node in the network (a new ALG node), alter routing information on the appropriate route devices, alter the OS configuration of the new ALG node, and resume functioning. An agent ALG may move or uninstall itself at the direction of an administrator or outside process, or may do so automatically.

Figure 7:
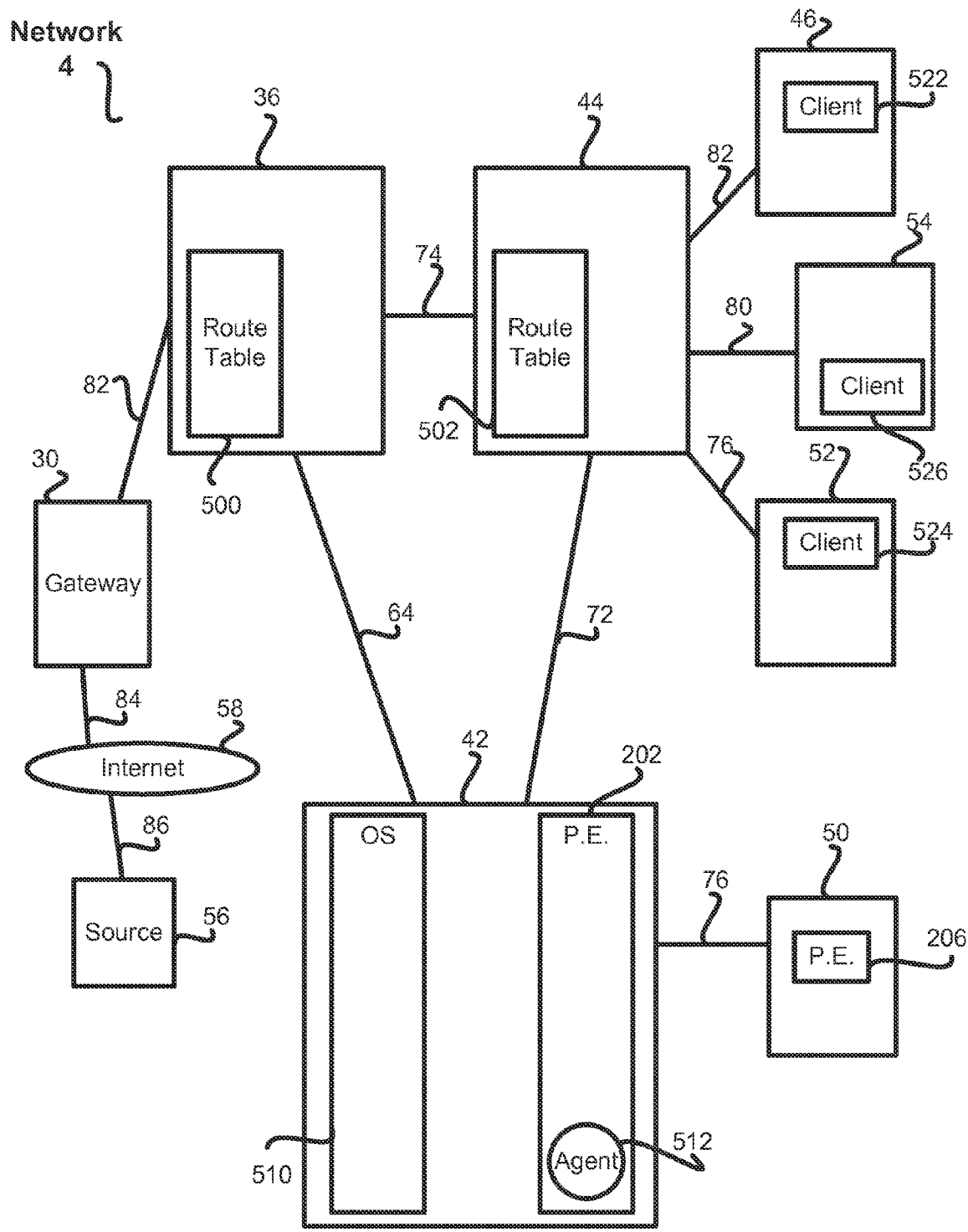
FIG. 7 is a block diagram illustrating a portion of the network of FIG. 3 according to an embodiment of the present invention.

In an exemplary embodiment an agent ALG which has installed itself on an ALG node may have aspects of its functionality modified. A system administrator may issue a command using, for example, a management console application, transmitting reconfiguring information to the agent ALG. For example, an agent ALG may be sent a work object and/or worksheet providing new or different capabilities. The system administrator may transmit to the agent ALG a new set of configuration information, such as a new ALG node and a new client list. The capability to quickly and easily alter the functionality of the agent ALG of the present invention reduces barriers to the use of ALGs. FIG. 7 is a block diagram illustrating a portion of network 4 of FIG. 3 according to an embodiment of the present invention. FIGS. 3 and 7 illustrate network 4 from different aspects; thus like numbered components are identical in function and structure. The portion of network 4 depicted in FIG. 7 includes nodes 30, 36, 42, 44, 46, 50, 52 and 54 and links 62, 64, 72, 74, 76, 78, 80 and 82. Link 84 transmits data between node 30 and other networks, such as Internet 58; node 56 may be accessed by the Internet 58. Node 56 connects to the Internet 58 via link 86. Node 56 acts as a source for information and maintains a source process (not shown). Node 30 acts as a gateway. Nodes 36 and 44 act as routers and maintain routing tables 500 and 502, respectively; routing tables 500 and 502 allow nodes 36 and 44 to route packets based on the destination IP address of the packets and possibly other information. Node 50 includes proactive environment 206. Node 42 includes proactive environment 202, OS 510 and agent ALG 512. OS 510 includes methods, such as sockets, allowing processes to intercept network packets received at node 42. Nodes 46, 52 and 54 include client processes 522, 524 and 526, respectively. Client processes 522-526 may be, for example, web browsers, video or audio players, or other applications. In alternate embodiments, the agent ALG of the present invention may work with other network topologies; for example, an agent ALG may execute on an agent environment situated directly on a route device.

Agent ALG 512 may act as any sort of ALG, according to known methods or new methods. The ALG functionality of agent ALG 512 is governed by its work object and worksheet (if any) and may be altered by altering its work object and worksheet.

Figure 8:
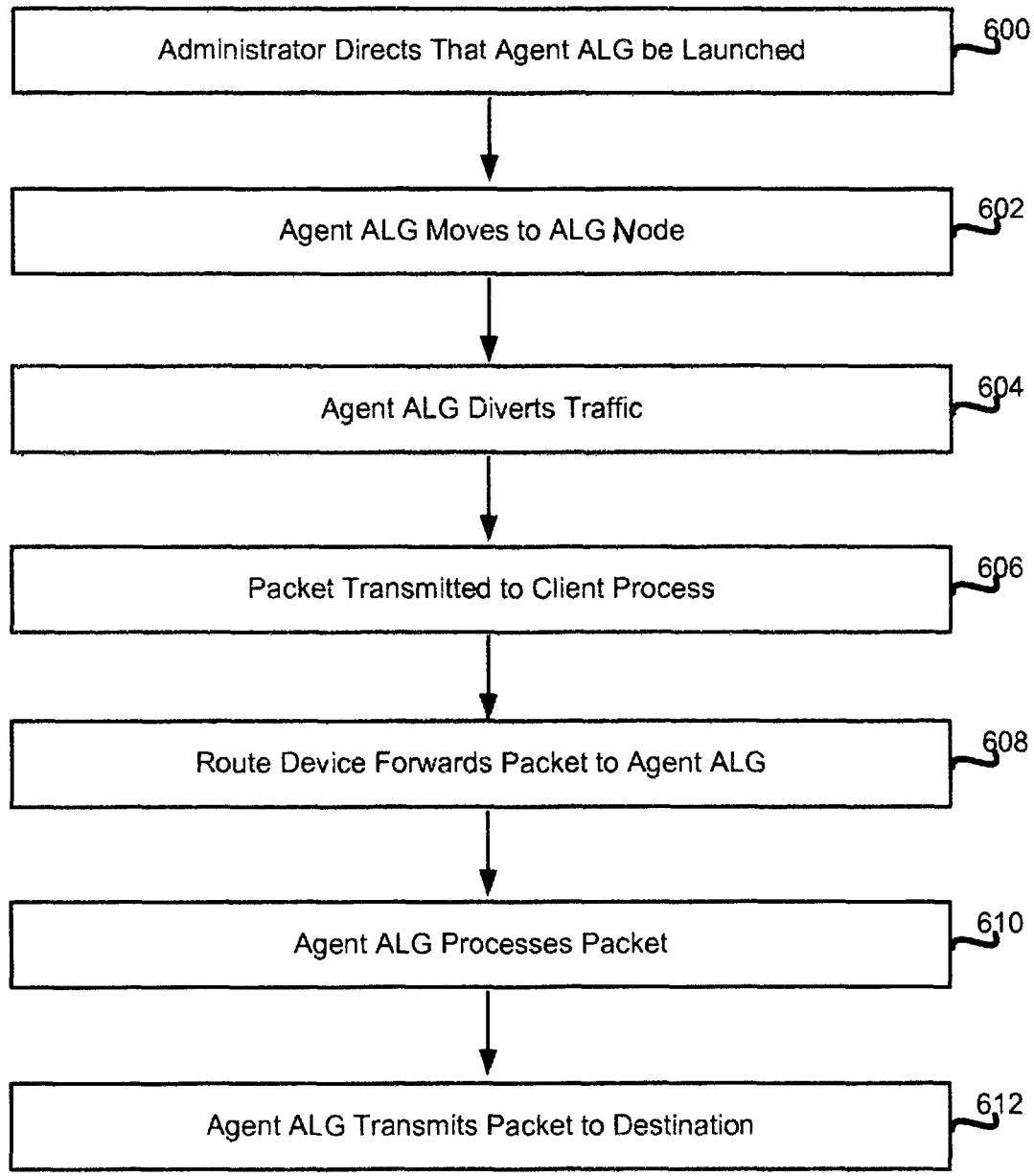
FIG. 8 is a flow chart illustrating the operation of an agent ALG according to an embodiment of the present invention.

FIG. 8 is a flow chart illustrating the operation of an agent ALG according to an embodiment of the present invention. Referring to FIGS. 7 and 8, in step 600, an administrator directs that an agent ALG be launched. For example, an administrator wishes that a media transcoder be positioned at node 42 to service client processes 522, 524 and 526, located at nodes 46, 52 and 54, respectively. Nodes 46, 52 and 54 may be considered client nodes. The administrator uses an interface, such as a management console application (not shown) located at node 50, to direct that an agent be instantiated. Proactive environment 206 instantiates agent ALG 512 using the Java™ "new" keyword and adds a work object and one or more worksheets to agent ALG 512 using methods of agent ALG 512. The work object and worksheets provide media transcoder functionality to agent ALG 512 but may provide other ALG functionality to agent ALG 512. At this point agent ALG 512, depicted as being located on node 42, exists on node 50 and has not yet moved to node 42. The administrator identifies the ALG node, the IP addresses for the client devices, the port number for the client processes, and possibly other information. A worksheet added to agent ALG 512 contains such information.

In step 602, the agent ALG moves to its ALG node. For example, agent ALG 512 uses its move method to move from node 50 to node 42, its ALG node, via link 76.

In step 604, the agent ALG modifies network route information to divert traffic to the agent ALG. In an exemplary embodiment the agent ALG identifies one or more route devices whose route information is to be altered to divert traffic to the agent ALG, modifies the route information for the route devices identified, and may configure the OS of the ALG node so that it may obtain relevant traffic received at the ALG node. The agent ALG is provided with information about the topology of the network on which it executes and functionality for using such information to determine, based on the client processes it is to serve, which route devices should have their route information modified and which traffic should be intercepted via the OS. For example, agent ALG 512 identifies node 36, which acts as a router, as the router which should have its routing table modified. Agent ALG 512, using a service located at node 42, modifies routing table 500 of node 36 so that all IP packets destined for client devices 522, 524 and 526 are instead sent to node 42. Agent ALG 512 sets up a socket, using OS 510, allowing it to accept network traffic sent to node 42. Due to the granularity of the socket, agent ALG 512 may receive all traffic sent to node 42. Therefore, agent ALG 512 may have to sort for relevant traffic, keep the relevant traffic, and forward all other traffic to the proper destination—which may be a process at node 42 or at another node.

In step 606, a source process transmits a packet of information to a client process. For example, client process 46 has requested a data stream from a source process on node 56. A packet of data (one packet among many in the requested data stream) is transmitted by the source process on node 56 via links 84 and 86 and Internet 58 and is received by node 30, acting as a gateway. Node 30 forwards the packet to node 36 via link 62.

In step 608, one of the route devices altered in step 604 receives the packet transmitted in step 606 and forwards the packet to the agent ALG. For example, node 36 receives the packet transmitted from node 56. Per the normal routing operation of node 36, node 36 decodes the IP address in the packet, and, per an entry in routing table 500, transmits the packet to node 42 via link 64. The packet is received by node 42. Agent ALG 512, using the socket set up in step 604, accepts the packe In step 610, the agent ALG processes the received packet. For example agent ALG 512 uses its work object and worksheets to filter data in the received packet, converting the data from an H.263 formatted video stream to an MPEG-2 formatted video stream, according to known methods.

In step 612, the agent ALG transmits the processed information to its destination. For example, agent ALG 512 transmits the packet via links 72 and 82 and node 44 to client node 46, then to client process 522.

Certain agent ALGs may require access to information sent in an upstream direction by client processes. For example, an agent ALG may require access to web site requests, commands to media streamers (e.g., start, stop), or other information which may be sent by client processes. An embodiment of the system and method of the present invention may function by diverting both upstream and downstream traffic to the agent ALG and having the agent ALG process both streams. To do so, the agent ALG alters the routing table of certain route devices so that traffic addressed to the source device is redirected to the ALG node. The OS of the ALG node may be altered so that the agent ALG may access the traffic. Such rerouting may be done in a manner similar to that described above for relevant downstream traffic. Relevant upstream traffic may be identified by both it source and destination address; however, routers may not be capable of switching data based on the source address. Therefore, the agent ALG may need to filter the upstream packets it receives for the source of the packets or other information. Packets having the destination address of the source process but which are not transmitted by client processes may be retransmitted without being processed by the agent ALG.

For example, referring to FIG. 7, agent ALG 512 operating on node 42 may be configured to act as a web cache by providing it with a work object and worksheets with such functionality. In such a case agent ALG 512 caches web pages frequently used by client processes 522, 524 and 526. Agent ALG 512 requires access to web page requests and other data sent by client processes 522, 524 and 526 to a remote source process, running on remote node 56. When a page is requested by a client process which is not stored by agent ALG 512, agent ALG 512 must request that page from the remote source process. This of course occurs most often after agent ALG 512 is first launched, and has a blank cache. To determine which pages are contained in its cache and which need to be requested from the remote source process, agent ALG 512 needs to access web page requests of client processes 522, 524 and 526. To access those requests agent ALG 512 alters routing table 502 of node 44 (acting as a router) so that packets received by node 44 having the IP address of remote node 56 (or any other remote source device) are forwarded to node 42. Agent ALG 512 alters the configuration of the OS of node 42 so that agent ALG 512 may receive the relevant upstream traffic. Agent ALG 512 receives traffic sent to node 44 having the IP address of remote node 56, accesses packets which are sent by client processes 522-526 to the remote source process, and ignores and passes on packets which are not sent by client processes 522-526 to remote node 56.

An agent ALG according to one embodiment of the system and method of the present invention may use one route device to both receive and transmit traffic. For example, referring to FIG. 7, agent ALG 512 may modify routing table 500 of node 36, acting as a router, so that downstream data being sent to client processes 522-526 is diverted to agent ALG 512. When agent ALG 512 transmits data to client processes 522-526 it may route the data via node 36 rather than node 44. Similarly, agent ALG 512 may modify routing table 500 of node 36 so that upstream traffic being sent to a source process is diverted to agent ALG 512, and may transmit data to the source process via node 36.

Figure 9:
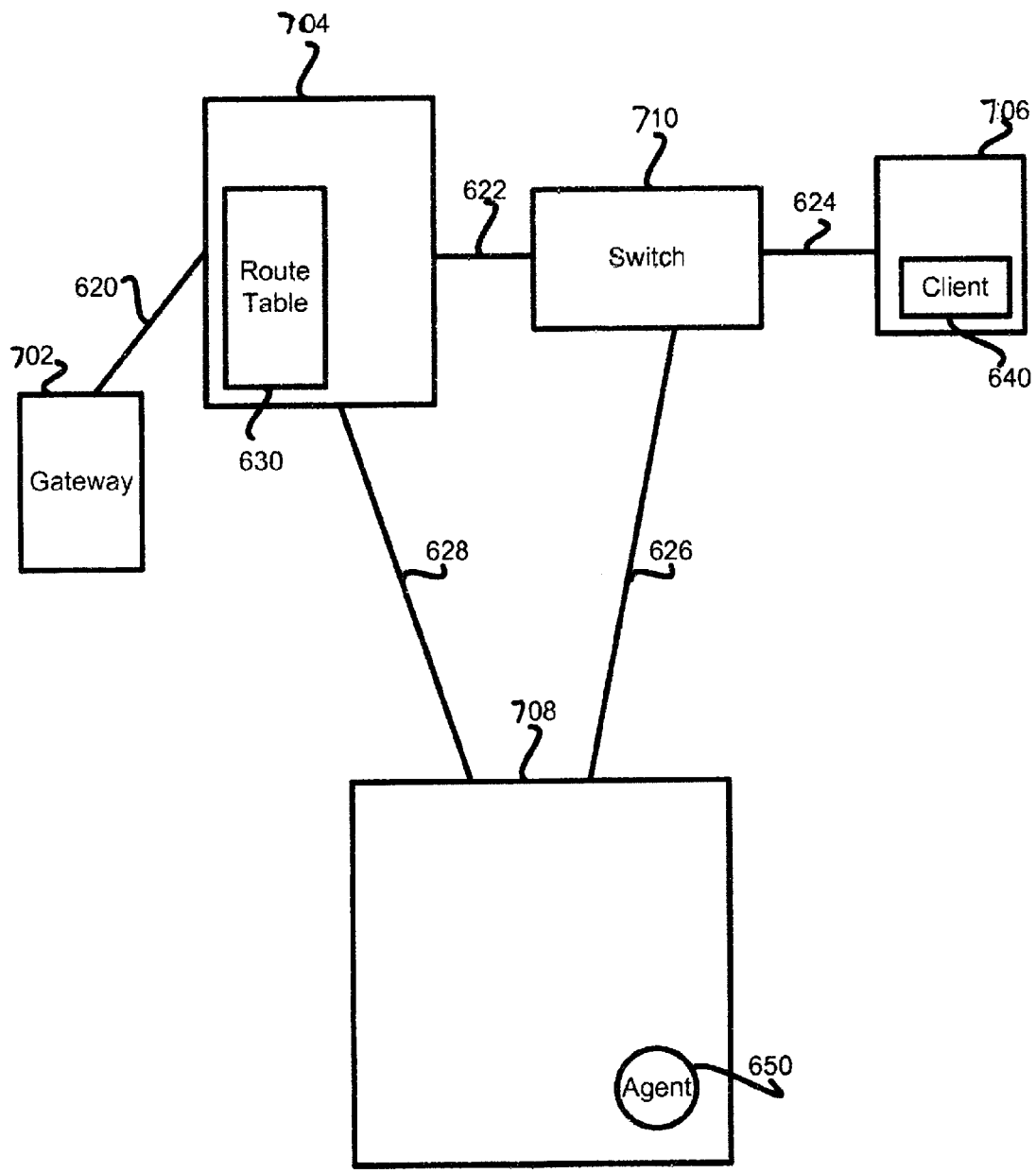
FIG. 9 is a block diagram illustrating a portion of a network according to an embodiment of the present invention.

FIG. 9 is a block diagram illustrating a portion of a network according to an embodiment of the present invention. The portion of the network depicted in FIG. 9 includes nodes 702, 704, 706 and 708; switch 710, functioning to route data on the Ethernet level; and links 620, 622, 624, 626 and 628. Node 704 acts as a router and maintains routing table 630. Node 708 includes agent ALG 650. Node 706 includes client process 640.

Referring to FIG. 9, traffic flows between a source process (not shown) and client process 640. Traffic from the source process enters the network via node 702, acting as a gateway. Agent ALG 650 may function according to the system and method of the present invention, and may access either downstream traffic flowing to client process 640, upstream traffic flowing from client process 640 to the source process, or both upstream and downstream traffic. To do so agent ALG 650 modifies routing table 630 of node 704 (acting as a router). To transmit data to client process 640, agent ALG 650 uses switch 710. Upstream data sent from client process 640 to agent ALG 650 is routed through node 704, then to node 708 and agent ALG 650. Upstream data sent from agent ALG 650 to a remote source via node 702 may also be routed through node 704.

In an alternate embodiment of the system and method of the present invention, an agent may use a service to provide the bulk of the ALG functionality. For example, an agent may install a service (an "ALG service") which itself alters the appropriate route devices and configures the OS of the ALG node (if appropriate), and which accepts, modifies or filters, and retransmits relevant traffic. An ALG service may have available native code (e.g., machine code) which executes faster than the code in which an agent ALG may be written. The ALG service may use other services to access and alter routing tables in remote devices, configure the OS on the ALG device, and accept and modify or filter relevant traffic—such a process may be similar to that described above with respect to the functioning of an agent ALG. To install an ALG service an agent ALG accepts the service from the proactive environment instantiating the agent ALG and, after moving to the ALG node, passes the service to the proactive environment of the ALG node. The proactive environment accepts and installs the ALG service. The ALG service may execute in conjunction with, or under the control or management of, the installing agent ALG, or may operate independently. The agent ALG may modify, move, or uninstall the ALG service.

IV. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention. For example, while the agent ALG of the system and method of the present invention is described as providing certain specific ALG functionality, other functionality may be provided.

What is claimed is:

1. At least one non-transitory machine-accessible medium storing instructions that when executed by at least one machine results in performance of operations comprising:

executing, at least in part, at least one mobile agent in at least one execution environment of at least one network node, the at least one mobile agent being capable of being of at least one class and at least one subclass, the at least one subclass being of the at least one class, the at least one class and the at least one subclass being to provide the at least one mobile agent with node resource usage permission capabilities, the at least one mobile agent being capable of accessing resources of the at least one network node in accordance with the node resource usage permission capabilities, the at least one mobile agent being capable of moving, at least in part, from the at least one network node to at least one other network node for execution, at least in part, in at least one other execution environment of the at least one other network node, the at least one mobile agent being capable of accessing other resources of the at least one other network node in accordance with the node resource usage permission capabilities;

wherein:

the at least one mobile agent comprises at least one agent application layer gateway;

the at least one mobile agent is to perform at least two of the following subparagraphs:

receive, at least in part, network traffic addressed to a client;

filter and/or modify the network traffic; and forward, at least in part, filtered and/or modified network traffic to the client.

2. The at least one machine-accessible medium of claim 1, wherein:

the at least one mobile agent provides functionality that to be distributed, at least in part, at multiple network nodes.

3. The at least one machine-accessible medium of claim 1, wherein:

the at least one execution environment and the at least one other execution environment comprise proactive environments.

4. The at least one machine-accessible medium of claim 1, wherein:

the at least one class is to provide, at least in part, certain functionality of the at least one mobile agent; and the at least one subclass is to provide, at least in part, additional functionality of the at least one mobile agent, the additional functionality being in addition to the certain functionality.

5. The at least one machine-accessible medium of claim 1, wherein:
the at least one class is to provide, at least in part, certain node resource access restrictions of the at least one mobile agent; and
the at least one subclass is to provide, at least in part, additional node resource access restrictions of the at least one mobile agent, the additional node resource access restrictions being in addition to the certain node resource access restrictions.

6. The at least one machine-accessible medium of claim 1, wherein:
the at least one mobile agent is to provide, at least in part, web cache functionality.

7. The at least one machine-accessible medium of claim 1, wherein:
the at least one mobile agent is to provide, at least in part, media transcoding functionality.

8. The at least machine-accessible medium of claim 1, wherein:
the at least one mobile agent is to provide, at least in part, firewall functionality.

9. The at least one machine-accessible medium of claim 1, wherein:
the at least one mobile agent is to access, at least in part, the resources of the at least one network node via at least one service of the at least one network node.

10. A method comprising:
executing, at least in part, at least one mobile agent in at least one execution environment of at least one network node, the at least one mobile agent being capable of being of at least one class and at least one subclass, the at least one subclass being of the at least one class, the at least one class and the at least one subclass being to provide the at least one mobile agent with node resource usage permission capabilities, the at least one mobile agent being capable of accessing resources of the at least one network node in accordance with the node resource usage permission capabilities, the at least one mobile agent being capable of moving, at least in part, from the at least one network node to at least one other network node for execution, at least in part, in at least one other execution environment of the at least one other network node, the at least one mobile agent being capable of accessing other resources of the at least one other network node in accordance with the node resource usage permission capabilities;
wherein:
the at least one mobile agent comprises at least one agent application layer gateway;
the at least one mobile agent is to perform at least two of the following subparagraphs:
receive, at least in part, network traffic addressed to a client;
filter and/or modify the network traffic; and
forward, at least in part, filtered and/or modified network traffic to the client.

11. The method of claim 10, wherein:
the at least one mobile agent provides functionality that to be distributed, at least in part, at multiple network nodes.

12. The method of claim 10, wherein:
the at least one execution environment and the at least one other execution environment comprise proactive environments.

13. The method of claim 10, wherein:
the at least one class is to provide, at least in part, certain functionality of the at least one mobile agent; and
the at least one subclass is to provide, at least in part, additional functionality of the at least one mobile agent, the additional functionality being in addition to the certain functionality.

14. The method of claim 10, wherein:
the at least one class is to provide, at least in part, certain node resource access restrictions of the at least one mobile agent; and
the at least one subclass is to provide, at least in part, additional node resource access restrictions of the at least one mobile agent, the additional node resource access restrictions being in addition to the certain node resource access restrictions.

15. The method of claim 10, wherein:
the at least one mobile agent is to provide, at least in part, web cache functionality.

16. The method of claim 10, wherein:
the at least one mobile agent is to provide, at least in part, media transcoding functionality.

17. The method of claim 10, wherein:
the at least one mobile agent is to provide, at least in part, firewall functionality.

18. The method of claim 10, wherein:
the at least one mobile agent is to access, at least in part, the resources of the at least one network node via at least one service of the at least one network node.

19. At least one network node that is usable with at least one other network node in at least one network, the at least one network node comprising:
a central processing unit;
the central processing unit being capable of execution of instructions stored at the at least one network node, the execution of the instructions resulting in performance of operations comprising:
executing, at least in part, at least one mobile agent in at least one execution environment of the at least one network node, the at least one mobile agent being capable of being of at least one class and at least one subclass, the at least one subclass being of the at least one class, the at least one class and the at least one subclass being to provide the at least one mobile agent with node resource usage permission capabilities, the at least one mobile agent being capable of accessing resources of the at least one network node in accordance with the node resource usage permission capabilities, the at least one mobile agent being capable of moving, at least in part, from the at least one network node via the at least one network to the at least one other network node for execution, at least in part, in at least one other execution environment of the at least one other network node, the at least one mobile agent being capable of accessing other resources of the at least one other network node in accordance with the node resource usage permission capabilities;
wherein:
the at least one mobile agent comprises at least one agent application layer gateway;
the at least one mobile agent is to perform at least two of the following subparagraphs:
receive, at least in part, network traffic addressed to a client;

filter and/or modify the network traffic; and
forward, at least in part, filtered and/or modified network traffic to the client.

20. The at least one network node of claim 19, wherein:
the at least one mobile agent provides functionality that to be distributed, at least in part, at multiple network nodes.

21. The at least one network node of claim 19, wherein:
the at least one execution environment and the at least one other execution environment comprise proactive environments.

22. The at least one network node of claim 19, wherein:
the at least one class is to provide, at least in part, certain functionality of the at least one mobile agent; and
the at least one subclass is to provide, at least in part, additional functionality of the at least one mobile agent, the additional functionality being in addition to the certain functionality.

23. The at least one network node of claim 19, wherein:
the at least one class is to provide, at least in part, certain node resource access restrictions of the at least one mobile agent; and
the at least one subclass is to provide, at least in part, additional node resource access restrictions of the at least one mobile agent, the additional node resource access restrictions being in addition to the certain node resource access restrictions.

24. The at least one network node of claim 19, wherein:
the at least one mobile agent is to provide, at least in part, web cache functionality.

25. The at least one network node of claim 19, wherein:
the at least one mobile agent is to provide, at least in part, media transcoding functionality.

26. The at least one network node of claim 19, wherein:
the at least one mobile agent is to provide, at least in part, firewall functionality.

27. The at least one network node of claim 19, wherein:
the at least one mobile agent is to access, at least in part, the resources of the at least one network node via at least one service of the at least one network node.

* * * * *